No. 691,973. Patented Jan. 28, 1902.
V. ROYLE.
MACHINE FOR PUNCHING JACQUARD CARDS.
(Application filed Dec. 4, 1900.)
(No Model.)
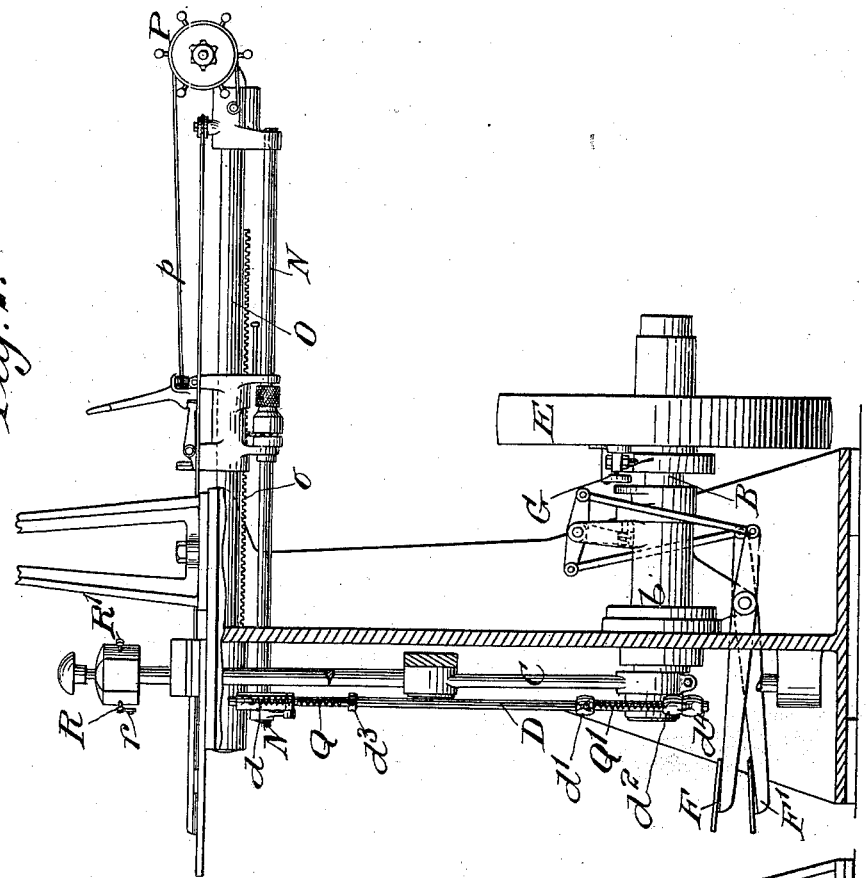
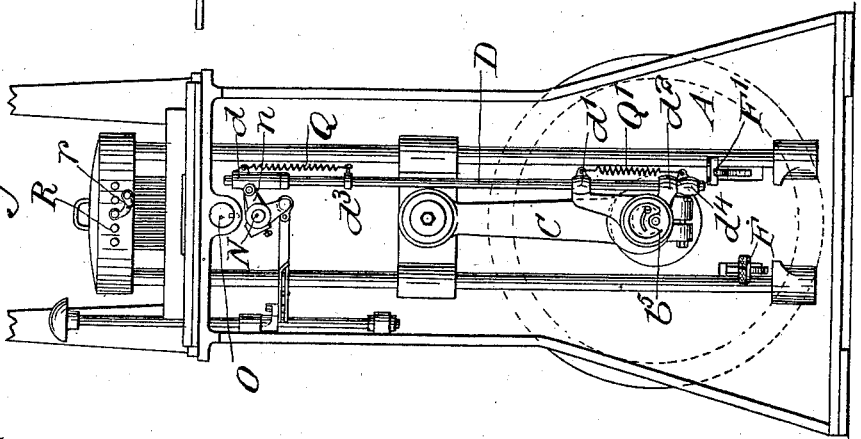
Witnesses:-
George Barry Jr
Henry Thieme.
Inventor:-
Vernon Royle
by attorneys

UNITED STATES PATENT OFFICE.

VERNON ROYLE, OF PATERSON, NEW JERSEY.

MACHINE FOR PUNCHING JACQUARD-CARDS.

SPECIFICATION forming part of Letters Patent No. 691,973, dated January 28, 1902.

Original application filed November 13, 1899, Serial No. 736,835. Divided and this application filed December 4, 1900. Serial No. 38,624. (No model.)

*To all whom it may concern:*

Be it known that I, VERNON ROYLE, a citizen of the United States, and a resident of Paterson, in the county of Passaic and State of New Jersey, have invented a new and useful Improvement in Machines for Punching Jacquard-Cards, of which the following is a specification.

My invention relates to an improvement in machines for punching jacquard-cards, and particularly to that type of machine shown, described, and claimed in United States Patent No. 644,871, granted me on the 6th day of March, 1900.

My present invention is a division of my application Serial No. 736,835, filed November 13, 1899, and is directed to means for preventing the feed-driving mechanism from injuring the escapement in case the latter fails to register.

In the accompanying drawings, Figure 1 is a view in front elevation of so much of the machine as will suffice to illustrate a practical embodiment of my invention; and Fig. 2 is a view of the same in side elevation, partly in section.

The supporting-frame is denoted by A and may be of any well-known or approved form suitable for supporting the different operating mechanisms. Near its base a drive-shaft B is mounted in an elongated bearing $b$ and is connected at its front end by means of suitable cams and eccentrics with a pitman C for operating the punches and a rod D for operating the escapement which controls the feed. On the rear end of the shaft B a drive-pulley E is loosely mounted and is driven from a suitable source of power. (Not shown.) The pulley E is clutched to and released from the shaft B by means of a pair of pedals F F', which operate a clutching mechanism, (denoted as a whole by G.) So far as my present invention is concerned the clutching mechanism may be of any well-known or suitable form, the particular form here shown being that which is specifically shown, described, and claimed in my pending application, Serial No. 736,835, hereinabove referred to and of which the present application is a division.

The escapement-operating rod D, hereinabove referred to, is connected with the escapement-rod N by means of a crank-arm $n$. The escapement-rod N is essentially a rock-shaft mounted in suitable bearings underneath the feed-table and carries an escapement mechanism comprising dogs constructed and arranged to engage successive teeth $o$ on the rack-bar O to permit the feed table or carriage to be drawn rearwardly by an actuating-spring on a drum P, the drum being connected with the carriage by a cord $p$. The peculiar structure of the escapement mechanism is fully set forth and claimed in the patent hereinbefore referred to and is briefly referred to here only for the purpose of showing the connection therewith of the improved operating-rod D. As heretofore constructed the laterally-vibrating dogs carried by the shaft N for engaging the teeth $o$ on the rack-bar have from one cause or another caught the teeth $o$ instead of sliding between two successive teeth, and the positive movement of the rod D has caused the breaking of the dog or some part of the mechanism which refused to yield as the rod was positively reciprocated by the drive-shaft B. I provide against liability of breakage as follows: The rod D has a free sliding movement in an elongated bearing $d$, pivoted to the crank-arm $n$, and also in bearings $d'$ $d^2$, connected with the eccentric-strap which embraces the eccentric $b^5$. The said rod D has further fixed to it a collar $d^3$ below the bearing $d$ and a collar $d^4$ below the bearing $d^2$. Coil-springs Q Q' connect the bearing $d$ with the collar $d^3$ on the rod and the bearing $d'$ with the collar $d^4$ on the rod, respectively, and the tension of these springs is relied upon to operate the rock-shaft N and throw the dogs into and out of engagement with the teeth on the rack-bar when the parts are working in perfect order, but when for any cause one of the escapement-dogs happens to engage the end of a tooth $o$ instead of entering the space between two consecutive teeth the operating-rod D will be allowed to move laterally under the positive motion of the drive-shaft B, the spring Q or Q', as the case may be, yielding to permit the rod D to move without endangering the integrity of the tooth or the dog.

What I claim is—

1. The combination with the rock-shaft for operating the escapement and the drive-shaft, of an operating-rod connecting the drive-shaft and rock-shaft, and means for connecting the operating-rod yieldingly with the drive and rock shafts whereby the drive-shaft may be operated while the escapement remains at rest whatever the position of the escapement, substantially as set forth.

2. The combination with the rock-shaft for operating the escapement and the drive-shaft, of an operating-rod connecting the drive-shaft and rock-shaft, and yielding connections between the said operating-rod and the rock-shaft and the operating-rod and drive-shaft, whereby the said operating-rod may be reciprocated while the rock-shaft remains at rest at any point in its movement, substantially as set forth.

3. The combination with the rock-shaft for operating the escapement and the drive-shaft, of bearings connected with the rock-shaft and drive-shaft, an operating-rod having a free longitudinal movement in said bearings and springs fixed at one end to the rod and at the opposite ends to the said bearings whereby the rod is permitted a longitudinal movement under spring tension relative to its bearings, substantially as set forth.

In testimony that I claim the foregoing as my invention I have signed my name, in presence of two witnesses, this 30th day of November, 1900.

VERNON ROYLE.

Witnesses:
FREDK. HAYNES,
HENRY THIEME.